A. H. MORTON.
PNEUMATIC TIRE.
APPLICATION FILED MAY 4, 1912.

1,062,024.

Patented May 20, 1913.
2 SHEETS—SHEET 1.

Witnesses:
H. J. Gittins.
N. L. McDaniell.

Inventor.
Arthur H. Morton
by Lynch & Dorer
his Attorneys

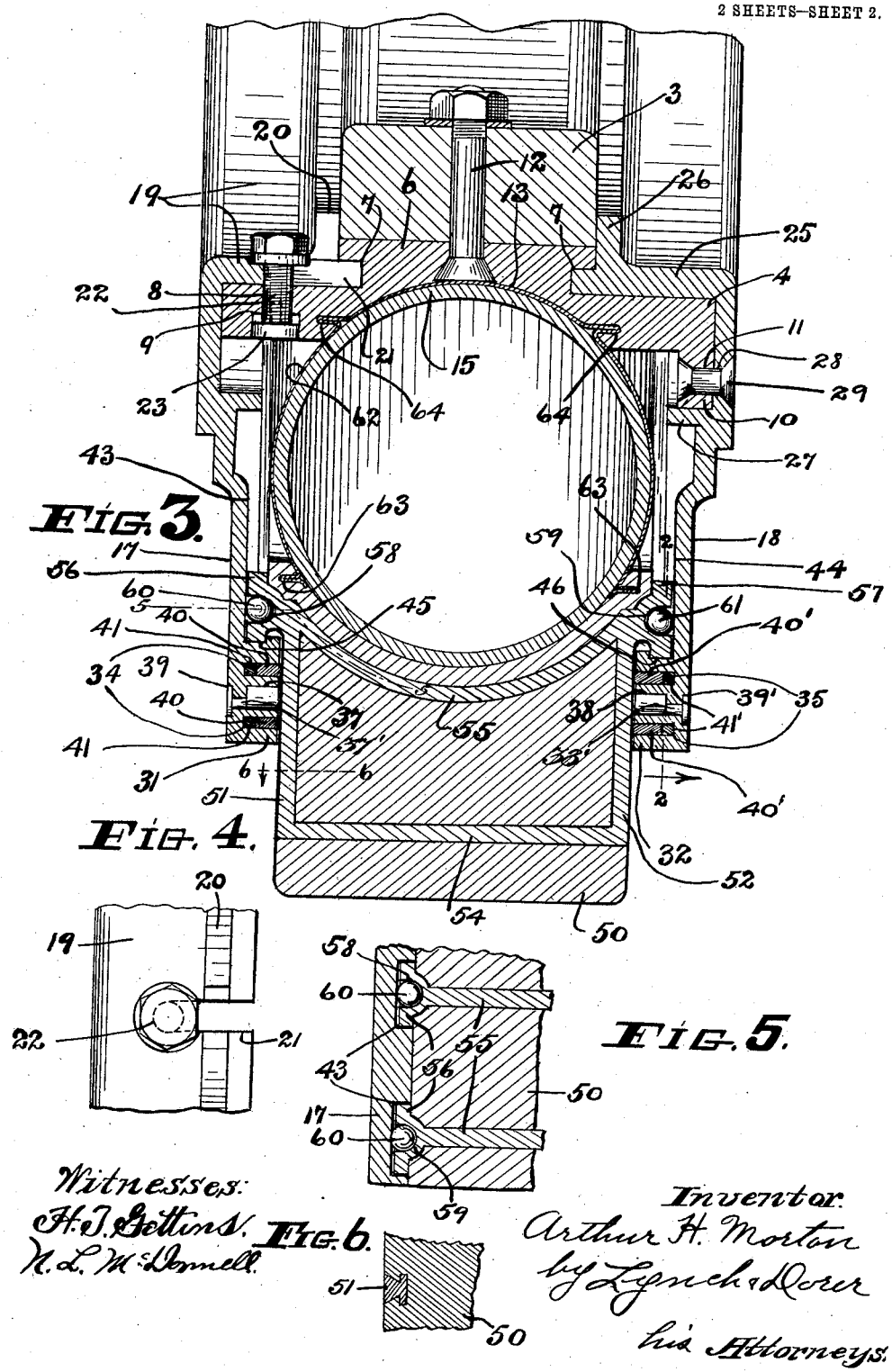

UNITED STATES PATENT OFFICE.

ARTHUR H. MORTON, OF CLEVELAND, OHIO.

PNEUMATIC TIRE.

1,062,024.  Specification of Letters Patent.  Patented May 20, 1913.

Application filed May 4, 1912. Serial No. 695,155.

*To all whom it may concern:*

Be it known that I, ARTHUR H. MORTON, a citizen of the United States of America, residing at Cleveland, in the county of Cuyahoga and State of Ohio, have invented certain new and useful Improvements in Pneumatic Tires; and I hereby declare the following to be a full, clear, and exact description of the invention, such as will enable others skilled in the art to which it pertains to make and use the same.

This invention relates to new and useful improvements in pneumatic tires.

The object of this invention is to provide a pneumatic tire having such an arrangement of parts that the inner or pneumatic tube will be thoroughly protected thereby avoiding any danger of the same being punctured.

A further object of my invention is to provide such an arrangement of parts as will permit the use of a heavier outer tire than is at present possible.

With these objects in view and with the intention of securing other advantages which will hereinafter appear, my invention consists in the features of construction and combination of parts, described in the specification, pointed out in the claims and illustrated in the accompanying drawings.

Figure 1:
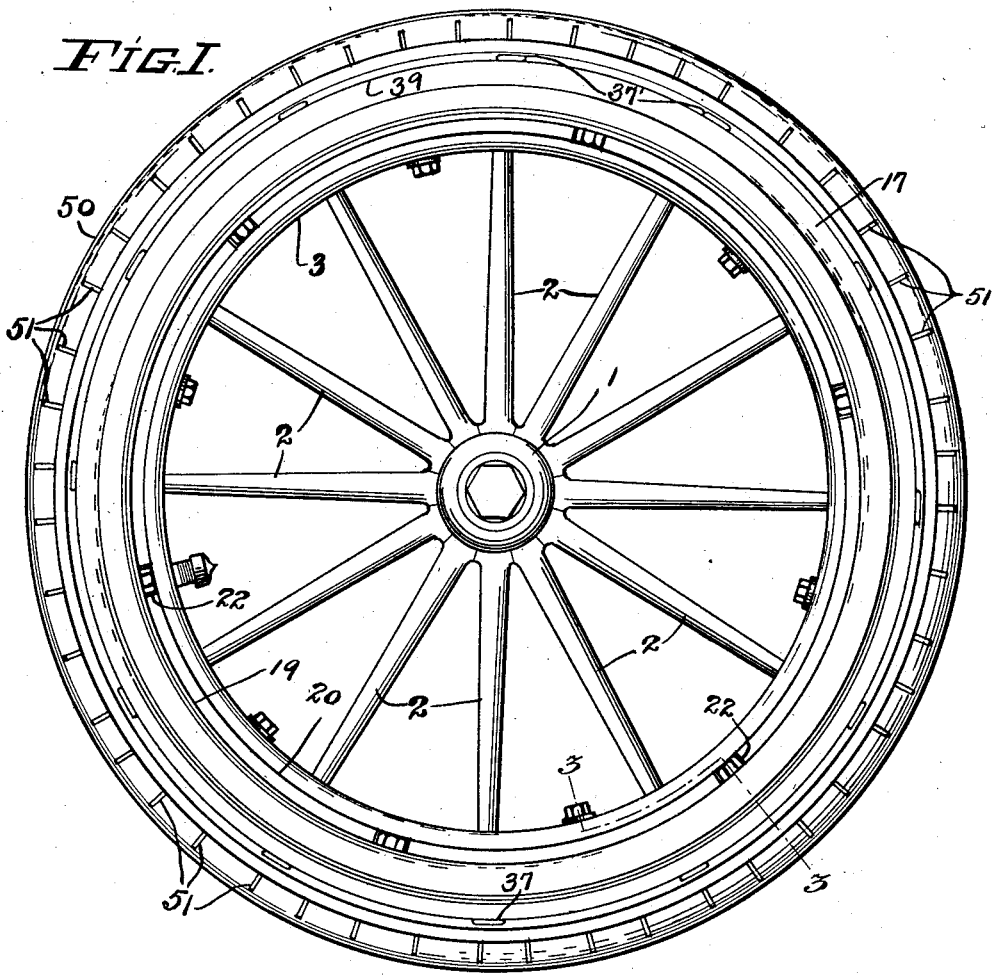
Figure 2:
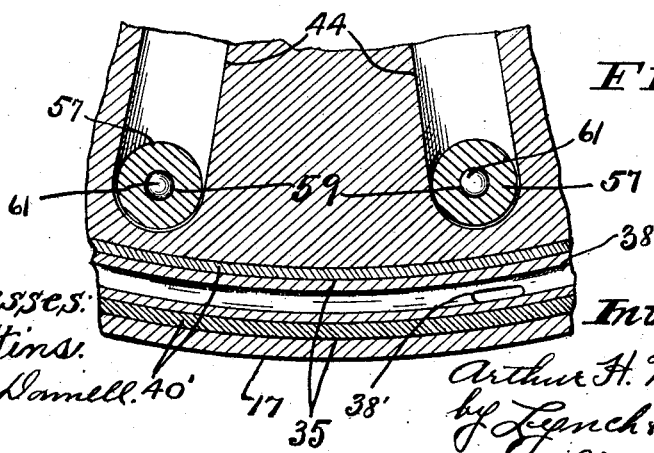

In the accompanying drawings Figure 1 is a view in elevation of a wheel embodying my invention. Fig. 2 is an enlarged detail view, in section on line 2—2, Fig. 3. Fig. 3 is a section on line 3—3, Fig. 1. Fig. 4 is an enlarged detail view. Fig. 5 is a sectional detail on line 5—5, Fig. 3. Fig. 6 is a sectional detail on line 6—6, Fig. 3.

Again referring to the drawings, 1 represents the hub of the wheel which is provided with the usual spokes 2 and a felly 3, all of the usual construction. Around the felly is arranged a rim which comprises a broad ring 4 which has a centrally arranged rib 6 the same width as the felly. In each side of said rib is formed an annular groove 7. At one side of the ring 4 are formed a series of bolt holes 8 which are preferably enlarged at one end, as at 9, the object of which will appear later. At the opposite side of the ring 4 is formed an annular vertically arranged flange 10 which is provided with bolt holes 11. The ring 4 is secured to the felly by means of bolts 12 and in the inner surface thereof is formed an annular concave groove 13 which is adapted to receive and form a seat for the inner tube, shown at 15. At each side of the rim are mounted vertically arranged annular side plates, shown at 17 and 18. These plates are alike except where they are secured to the rim, the plate 17 being designed to be removably secured to the rim, while the plate 18 is designed to be permanently secured to the rim. In order to secure it to the rim the plate 17 has a horizontally arranged annular flange 19 which extends in over the ring 4 and the innermost edge thereof enters the annular groove 7 in the rib 6. The flange 19 is provided with a vertically arranged flange 20 which abuts against the side of the rib 6 and the felly 3. The flange 19 is provided with a series of slots 21 which extend inwardly from the outer edge of the flange and the inner portions of the said slots are adapted to register with the bolt holes 8 in the ring 6. Bolts 22 are passed through the bolt holes in the ring 6 and through the said slots so as to secure the side plate to the rim and each bolt is preferably provided with a fixed collar 23 which fits into the enlarged portion 9 of the bolt hole 8 which prevents the bolt from being entirely withdrawn from the bolt hole but allows it to be loosened up when it is desired to remove the plate 17. The plate 18 is provided with a horizontally arranged annular flange 25 which fits in over the opposite side of the ring 4 and the inner edge thereof fits into the groove 7 in the rib 6. The flange 25 is provided with a vertically arranged annular flange 26 which abuts against the rib 6 and the felly. On the inner face of the plate 18 is formed an annular flange 27 which abuts against the flange 10 and a series of bolt holes 28 are formed in the plate 18 which register with the bolt holes in the flange 10 and through the registering holes bolts or rivets 29 are passed for permanently securing the plate 18 to the rim.

Near the outer edge of each of the plates 17 and 18 on the inner faces thereof are formed annular enlargements or flanges, shown at 31 and 32, respectively. In the face of each flange are formed a pair of annular grooves, shown at 34 and 35, and in each of the plates between the said grooves is formed an annular channel, shown at 37 and 38. These channels communicate with annular grooves 39 and 39' formed in the outer faces of said plates through small passageways 37' and 38'. In the grooves 34 and 35 are arranged metallic packing rings 40 and 40', and between each packing ring and the end of its groove is arranged a quantity of a resilient material, such as soft rubber, shown at 41 and 41'. In the inner faces of said side plates 17 and 18 are formed a series of radial guideways 43 and 44 respectively, which terminate at the flanges 31 and 32 and in the edges of said flanges are formed depressions or seats 45 and 46 respectively. The pneumatic tube 15 before referred to is arranged around the ring 4 between the side plates 17 and 18, but the said side plates do not inclose it tightly, there being quite a space left between each side of the tube 15 and the adjacent side plate to allow for the expansion of the tube. The pneumatic tube itself is preferably made of three-ply canvas which is thoroughly impregnated with rubber to render it both air-tight and water-proof and is also preferably lined on the inside with rubber. Around the pneumatic tube and between the side plates 17 and 18 is arranged a hard rubber tire 50. The surface of this tire where it comes in contact with the pneumatic tube is concave to correspond to the curvature of the pneumatic tube. Within and spaced around each side of the tire are a series of radially arranged bars or plates 51 and 52 respectively, one plate on one side of the tire being opposite a similar plate on the opposite side of the tire, and each pair of opposite plates are preferably connected by a straight cross bar 54 and a curved bar 55. The plates 51 and 52 are T-shaped in cross-section and are arranged with their outer faces flush with the outer face of the tire and the flange on the inner end of each plate serves to hold it on the tire. At the upper end of each of said plates 51 and 52 is arranged a head, shown at 56 and 57, respectively. Each head has a flat face and each head is adapted to fit into one of the guideways on the inner surface of the side plates. In each head is formed a socket, shown at 58 and 59 respectively, and in said sockets are arranged balls, shown at 60 and 61.

In order to thoroughly protect the inner tube from any fine particles of sand which may work up within the side plates a waterproof covering or envelop 62 is provided which extends between the tube and the ring 4 and around both sides of the tube, and the free ends of said envelop are secured in slots 63 formed in the hard rubber tire. Also in order to prevent any displacement of said covering portions of said envelop are folded and are secured in slots 64 formed in the ring 4.

From the foregoing explanation it will be seen that when the tire is in use there will be an up and down movement of portions of the hard rubber tire between the side plates 17 and 18. Now as the hard rubber tire moves up and down the plates 51 and 52 will slide up and down between the side plates 17 and 18 and will also prevent any lateral expansion of the tire that might cause it to bind between said side plates. The heads on the upper end of said plates will travel up and down their guideways allowing full resiliency to the tire and yet locking the tire to the side plates so that there will be no lost motion between the tire and the plates and consequently there will always be perfect traction. Also the heads on the upper ends of the plates prevent any sidewise displacement of the tire and take the strain in turning corners or the like. Now as the tire moves up and down there will be a tendency for sand and dust to creep up between the hard tire and the side plates but the washers which are always held in contact with the sides of the tires will practically prevent this and if any moisture or mud passes the outer washers the water will then flow into the passageways between the rows of washers and the centrifugal motion or force produced by the rotation of the wheel will force the water outwardly to the outside of the plates.

What I claim is,—

1. The combination with the felly of a wheel, of a rim, an annular side plate secured at each side of said rim, said side plates having flanges which overlap the upper surface of the said rim, bolts securing said side plates to said rim, a pair of annular grooves formed in each side plate on the inner surfaces thereof, packing rings arranged in said grooves, a channel formed in each side plate intermediate of said grooves and arranged to communicate with the outer surface of said plate, a pneumatic tube arranged between the side plates adjacent the rim and a hard rubber tire arranged between said side plates around said pneumatic tube.

2. The combination with the felly of a wheel, of a rim arranged around the felly, side plates secured to said rim and having radial guideways in their inner surfaces, a pneumatic tube arranged between said side plates adjacent said rim, a hard rubber tire arranged outside said pneumatic tube between said side plates, a series of plates embedded at each side of said hard rubber tire, the surfaces of said plates being flush with the surfaces of the tire, heads arranged at the upper ends of said plates and adapted to travel in said guideways formed in the inner faces of said side plates, a socket formed in each head and a ball arranged in each socket, for the purpose set forth.

3. The combination with the felly of a wheel, of a rim arranged around the felly, side plates secured to said rim, said side plates being provided on their inner surfaces with radial guideways and annular grooves, a pneumatic tube arranged between said side plates adjacent said rim, a hard rubber tire arranged outside said pneumatic tube between said side plates, a series of plates embedded at each side of said hard rubber tire, heads arranged at the upper ends of said plates and adapted to travel in the radial guideways formed in the inner surfaces of said side plates and washers arranged in the annular grooves in the inner surfaces of said side plates so as to bear against the sides of said hard rubber tire.

4. The combination with the felly of a wheel, of a rim arranged around the felly, side plates secured to said rim, said side plates being provided on their inner surfaces with guideways and annular grooves, each plate being also provided with a channel intermediate of the annular grooves, a pneumatic tube arranged between said side plates adjacent said rim, a hard rubber tire arranged outside of said pneumatic tube between said side plates, a series of plates embedded at each side of said hard rubber tire, heads provided with sockets arranged at the upper ends of said plates and adapted to travel in the radial grooves formed in the inner surfaces of said side plates, balls arranged in said sockets and washers arranged in the annular grooves.

In testimony whereof, I sign the foregoing specification, in the presence of two witnesses.

ARTHUR H. MORTON.

Witnesses:
 VICTOR C. LYNCH,
 N. L. McDONNELL.

Copies of this patent may be obtained for five cents each, by addressing the "Commissioner of Patents. Washington, D. C."